United States Patent [19]

Ueno

[11] Patent Number: 5,684,849
[45] Date of Patent: Nov. 4, 1997

[54] DIGITAL CIRCUIT FOR DETECTING COINCIDENCE OF TWO SUCCESSIVE WORDS OF INCOMING SERIAL DATA AND A METHOD THEREOF

[75] Inventor: Tsukasa Ueno, Tokyo, Japan

[73] Assignee: NEC Corporation, Tokyo, Japan

[21] Appl. No.: 585,463

[22] Filed: Jan. 16, 1996

[30] Foreign Application Priority Data

Jan. 13, 1995 [JP] Japan ................................. 7-003980

[51] Int. Cl.6 .................................................. G11C 19/00
[52] U.S. Cl. .................................... 377/54; 340/146.2
[58] Field of Search .......................... 377/54; 340/146.2

[56] References Cited

U.S. PATENT DOCUMENTS 3,887,918  6/1975  Bailey et al. ................. 343/17.2 R

FOREIGN PATENT DOCUMENTS 360007503  1/1985  Japan ................................. 340/146.2
63-279632  11/1988  Japan .
5-110541  4/1993  Japan .

Primary Examiner—Margaret Rose Wambach
Attorney, Agent, or Firm—Sughrue, Mion, Zinn, Macpeak & Seas, PLLC

[57] ABSTRACT

In order to effectively detect coincidence of consecutively transmitted adjacent data words, a shift register is provided for converting incoming serial data to n-bit parallel data. The serial data includes a plurality of identical words each consisting of n bits. A bit coincidence detector is coupled to the shift register so as to determine if a n-stage shifted bit of a given word coincides with a bit which is included in a word subsequent to the given word and which corresponds to the n-stage shifted bit. The bit coincidence detector generates a coincidence check bit which indicates a bit coincidence result. Both the n-bit parallel data and the coincidence check bit are latched after each word has been converted to corresponding parallel data.

5 Claims, 4 Drawing Sheets

DIGITAL CIRCUIT FOR DETECTING COINCIDENCE OF TWO SUCCESSIVE WORDS OF INCOMING SERIAL DATA AND A METHOD THEREOF

BACKGROUND OF THE INVENTION

1. Field of the Invention

The present invention relates generally to improved techniques for detecting coincidence of adjacent words of incoming serial data, and more specifically to a circuit and method of providing information for ascertaining whether or not the adjacent words coincide with each other. Each of the words is identical and defined by a predetermined number of bats and sent to the circuit over a radio or wire transmission path at a high speed.

2. Description of the Related Art

A digital word coincidence detector is known in the art, which determines whether or not the adjacent words of incoming serial data coincide with each other. By way of example, such a detector is applicable to a setup signalling procedure in the ISDN (integrated services digital network). That is, when a terminal of the network wishes to establish a connection with an exchange associated therewith, a plurality of setup messages are reciprocated between the terminal and the exchange over a so-called "D" signalling channel. Each message includes a plurality of identical words which are successively transmitted in series. When the exchange (for example) detects that the occurrences of coincidence of the adjacent words reaches a predetermined number in the transmitted message, the routine of the procedure steps to the subsequent message transmission.

Before turning to the present invention, it is deemed advantageous to briefly describe a first known circuit with reference to FIG. 1.

The circuit of FIG. 1 includes a shift register 10 and a first-in-first-out (FIFO) (or RAM (random access memory)) 12.

The shift register 10 converts incoming serial data SD to an n-bit parallel data in synchronism with a clock CLK applied thereto. The FIFO 12 is a buffer memory and temporarily stores the n-bit parallel data from the shift register 10 using a timing signal. Following this, the FIFO 12 applies the stored parallel data to a CPU (not shown). This prior art device has drawbacks so for example, the burden on the CPU increases the CPU has to determine whether or not every two adjacent words are identical with each other.

A second known circuit, which is disclosed in Japanese laid-open Patent Application 63-279632, determines if the word currently processed coincides with the previous processed word. If the two words are found coincident with each other, the coincidence information is stored in a RAM. Otherwise, the content of the RAM is reset to zero. Thus, the number of successive occurrences of word coincidence is stored in the RAM, and if the number exceeds a predetermined figure, the input word is acquired by a CPU. Thus, this known circuit has encountered difficulties in that the CPU is unable to quickly receive the incoming data because it must wait for the result of the counting operation.

A third known circuit, which is disclosed in Japanese Laid-open Patent Application 5-110541, includes two detectors: one is provided for detecting incoincidence of patterns while the other detects the number of continuous occurrences. This prior art also suffers from the same problem as in the second prior art device described above.

SUMMARY OF THE INVENTION

It is therefore an object of the present invention to provide an improved word coincidence detector by which a CPU is able to quickly acquire the coincidence check result without being overly burdened.

Another object of the present invention is to provide a method of detecting adjacent words of incoming serial data by which method a CPU is able to quickly acquire the coincidence check result without being overly burdened.

A first aspect of the present invention resides in a word coincidence detector, comprising: a shift register for converting incoming serial data to n-bit parallel data, the serial data including a plurality of identical words each consisting of n bits; a bit coincidence detector coupled to the shift register so as to determine if a n-stage shifted bit of a given word coincides with a bit which is included in a word subsequent to the given word and which corresponds to the n-stage shifted bit the bit coincidence detector generating a coincidence check bit which indicates a bit coincidence result; and a latch for latching the n-bit parallel data and the coincidence check bit after each word has been converted to corresponding parallel data.

A second aspect of the present invention resides in a method of detecting coincidence of consecutively transmitted adjacent data words, comprising the steps of: (a) converting incoming serial data to n-bit parallel data, the serial data including a plurality of identical words each consisting of n bits; (b) determining if a n-stage shifted bit of a given word coincides with a bit which is included in a word subsequent to the given word and which corresponds to the n-stage shifted bit, and generating a coincidence check bit which indicates a bit coincidence result; and (c) latching the n-bit parallel data and the coincidence check bit after each word has been converted to corresponding parallel data.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

One preferred embodiment of the present invention is discussed with reference to FIGS. 2–4.

Figure 1:
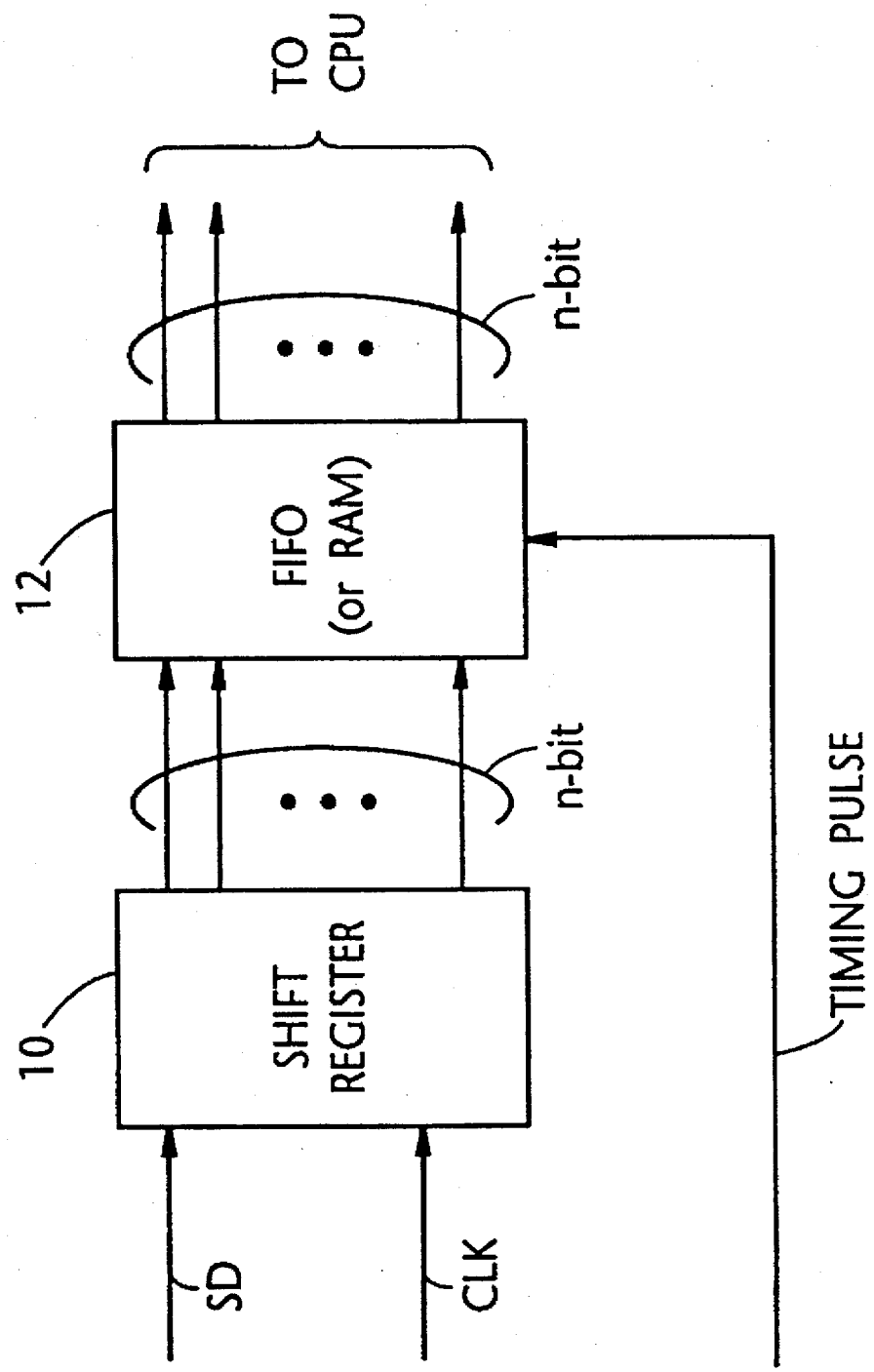
FIG. 1 is a block diagram showing a conventional circuit arrangement for use in preparation of word coincidence determination in a CPU, paragraphs.
Figure 2:
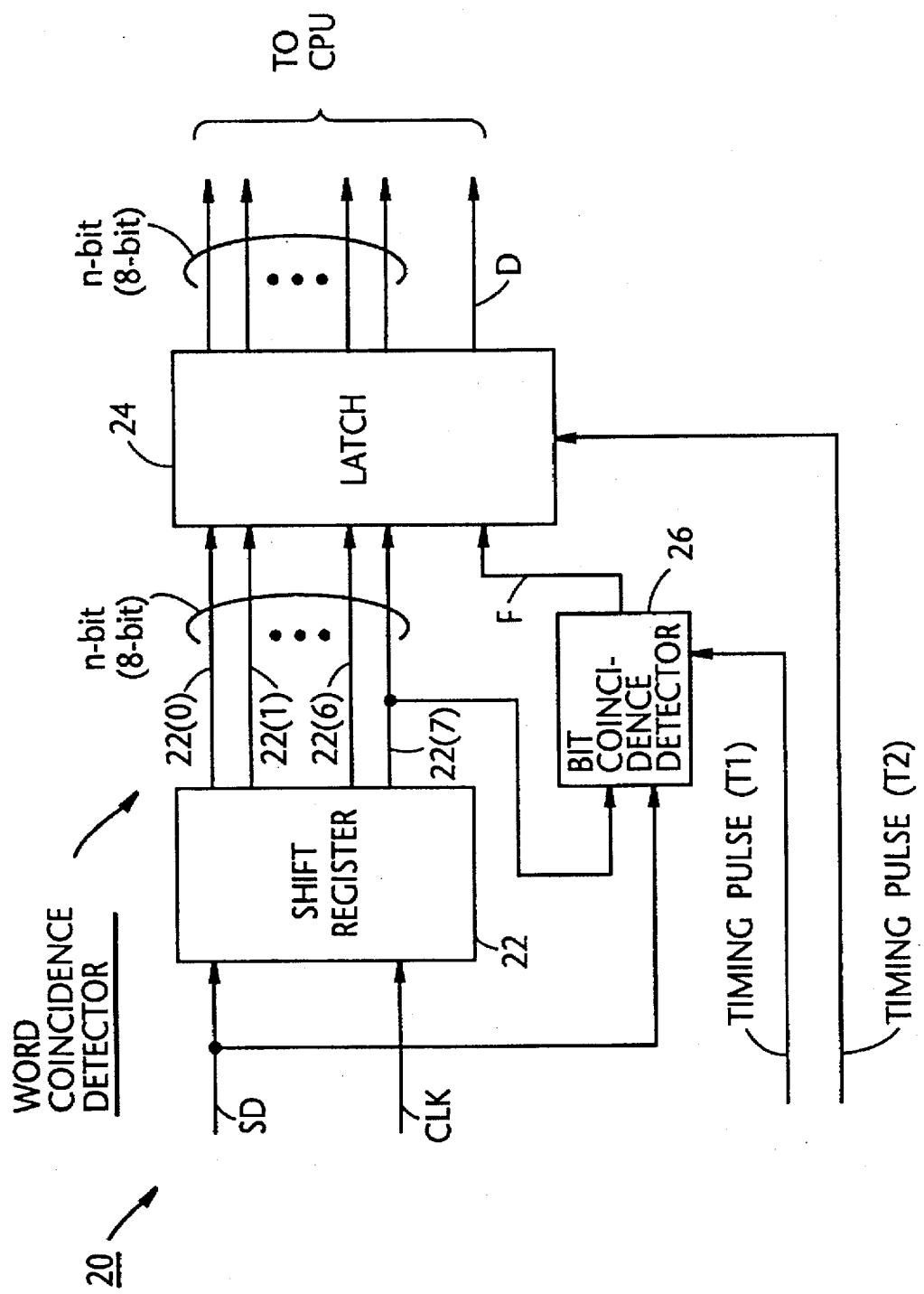
FIG. 2 is a block diagram showing an embodiment of the present invention.

As shown in FIG. 2, a word coincidence detector 20 includes a shift register 22, a latch 24, and a bit coincidence detector 26. The shift register 22 is identical to the counterpart of FIG. 1.

In the instant disclosure, the shift register 22 is configured so as to convert incoming serial data to 8-bit parallel data. However, the number of the parallel bits is in no way limited to "eight".

The shift register 22 successively receives a serial data SD which includes a series of words. These words are originally identical with each other and each may include a bit error(s) while being transmitted. In FIG. 4, the serial data SD is schematically shown which includes a series of words and wherein numbers "0, 1, 2, ..., 7", "0', 1', 2', ..., 7'", etc. respectively indicate bit numbers. As mentioned above, the words are identical with each other and thus, the corresponding bits of words should coincide with each other.

The shift register 22 is supplied with the serial data SD and shifts the inputted bits on a one-by-one basis in synchronism with a clock CLK (FIGS. 2 and 5), and produces 8-bit parallel data at output terminals 22(0), 22(1), ..., 22(7).

The bit coincidence detector 26 receives the 8-stage shifted bit appearing at the output terminal 22(7) and also receives the corresponding bit of the subsequent word included in the serial data SD.

Figure 3:
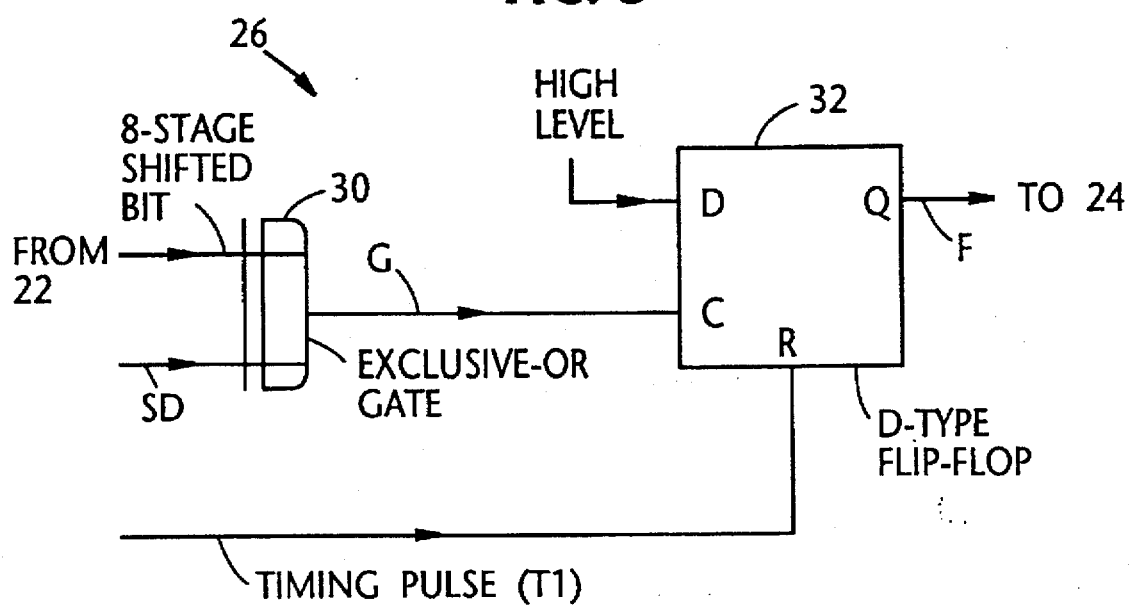
FIG. 3 is a block diagram showing in detail one block of FIG. 2.
Figure 4:
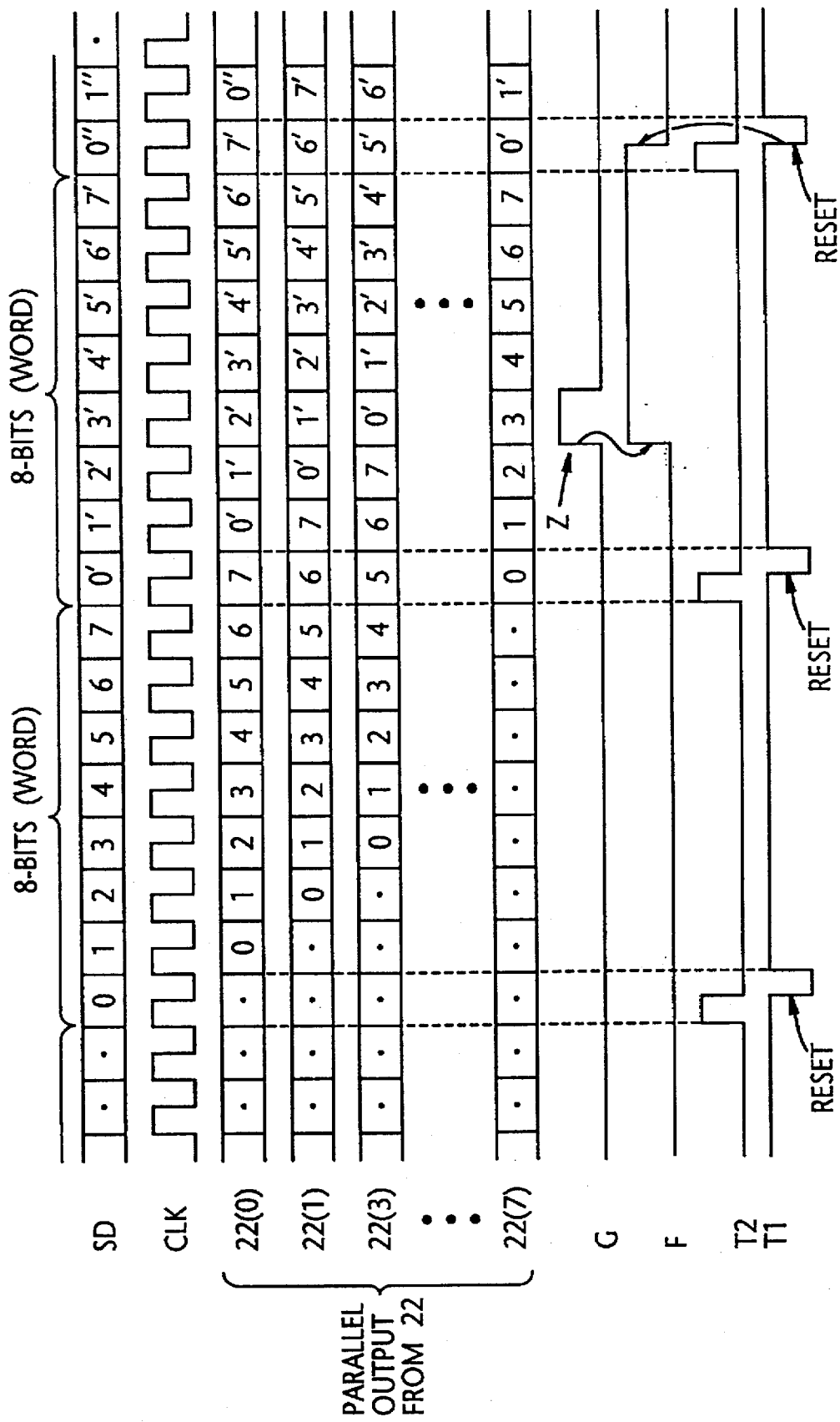
FIG. 4 is a timing chart showing the operation of the embodiment shown in FIGS. 2 and 3.

Referring to FIG. 3, the bit coincidence detector 26 is shown in detail and includes an exclusive-or gate 30 and a D-type flip-flop 32. As shown, the exclusive-or gate 30 receives the 8-stage shifted bit appearing at the output terminal 22(7) and also receives the corresponding bit of the subsequent word included in the serial data SD. The flip-flop 32 has a clock terminal C to which the output (denoted by G) of the exclusive-or gate 30 is applied, a data terminal D to which a high logic level H (+5V merely byway of example) is constantly applied, a reset terminal R to which a timing pulse T1 (see also FIG. 4) is applied, and an output terminal Q.

The exclusive-or gate 30 generates the output thereof G which assumes a low logic level L when the two bits applied thereto coincides with each other while assuming a high logic level H if the two bits are not identical. As best shown in FIG. 4, the flip-flop 32 is cyclically reset by the timing pulse T1.

It is readily understood that the flip-flop 32 continues to output a low logic level L if the output of the gate 30 remains low. The gate 30 detects incoincidence of the two bits applied thereto and generates a high level H as indicated by "Z" in FIG. 4. In this case, the flip-flop 32 responds to tame high level H of the output G and changes an output F to its high level H.

The latch 24, in response to a timing pulse T2, receives or acquires the 8-bit parallel data from the shift register 22 and the output of the flip-flop 32 (FIGS. 2 and 3). Thus, the word coincidence information appears at the output of the latch 24.

Figure 5:
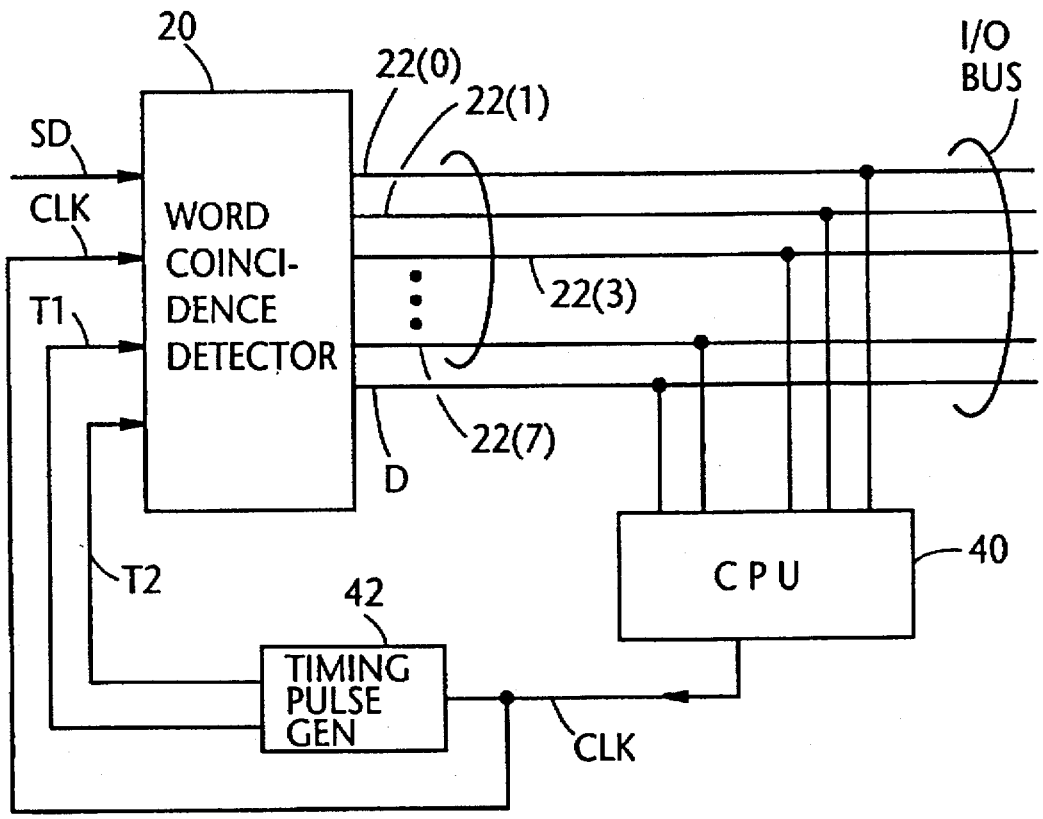
FIG. 5 is a block diagram showing the arrangement of FIG. 2 which is coupled to a CPU.

FIG. 5 is a block diagram showing the word coincidence detector 20 which is coupled to a CPU 40 and a timing pulse generator 42. The word coincidence information appearing at the output terminals of detector 20 is immediately available to the CPU 40. The timing pulse generator 42 receives the clock CLK and generates the two timing pulses T1 and T2. Further, the clock CLK from the CPU is directly applied to the word coincidence detector 20.

It will be understood that the above disclosure is representative of only one possible embodiment of the present invention and that the concept on which the invention is based is not specifically limited thereto.

What is claimed is:

1. A word coincidence detector, comprising:

a shift register for converting incoming serial data to n-bit parallel data, said serial data including a plurality of identical words each consisting of n bits;

a bit coincidence detector coupled to said shift register so as to determine if a n-stage shifted bit of a given word coincides with a bit which is included in a word subsequent to said given word and which corresponds to said n-stage shifted bit, said bit coincidence generating a coincidence check bit which indicates a bit coincidence result; and a latch for latching said n-bit parallel data and said coincidence check bit after each word has been converted to corresponding parallel data.

2. A word coincidence detector as claimed in claim 1, wherein said bit coincidence detector comprises:

an exclusive-or gate which receives said incoming serial data on a bit-by-bit basis and said n-stage shifted bit and which produces an output indicating a result of an exclusive-or operation; and a flip-flop coupled to receive said output of said exclusive-or gate and generating an output as said coincidence check bit and being reset every time said latch has latched said n-bit parallel data and said coincidence check bit.

3. A word coincidence detector as claimed in claim 2, wherein said flip-flop is a D-type flip-flop comprising:

a clock input terminal to which the output of said exclusive-or gate is applied;

a data input terminal to which a predetermined logic level is continuously applied;

a reset terminal which receives a signal for resetting said flip-flop; and an output terminal from which said coincidence check bit is generated.

4. A word coincidence detector as claimed in claim 1, wherein said latch is operatively coupled to a central processing unit (CPU).

5. A method of detecting coincidence of consecutively transmitted adjacent data words, comprising the steps of:

(a) converting incoming serial data to n-bit parallel data, said serial data including a plurality of identical words each consisting of n bits;

(b) determining if a n-stage shifted bit of a given word coincides with a bit which is included in a word subsequent to said given word and which corresponds to said n-stage shifted bit, and generating a coincidence check bit which indicates a bit coincidence result; and (c) latching said n-bit parallel data and said coincidence check bit after each word has been converted to corresponding parallel data.

* * * * *